United States Patent [19]
Park et al.

[11] Patent Number: 5,729,339
[45] Date of Patent: Mar. 17, 1998

[54] SWING ANGLE MEASURING APPARATUS FOR SWING FREE OPERATION OF CRANE

[75] Inventors: Byung-Suk Park; Ji-Sup Yoon; Jae-Sol Lee; Hyun-Soo Park, all of Daejeon-Si, Rep. of Korea

[73] Assignee: Korea Atomic Energy Research Institute, Daejeon-Si, Rep. of Korea

[21] Appl. No.: 633,340

[22] Filed: Apr. 17, 1996

Related U.S. Application Data

[63] Continuation-in-part of Ser. No. 192,291, Feb. 4, 1994, abandoned.

[30] Foreign Application Priority Data

Sep. 2, 1993 [KR] Rep. of Korea ............... 93-17481

[51] Int. Cl.⁶ .................. G01B 11/26; G01C 3/00; B66C 13/06
[52] U.S. Cl. .................. 356/152.2; 212/273; 212/276; 356/3.06
[58] Field of Search .................. 212/273, 276; 356/3.06, 152.2; 376/248, 258, 260

[56] References Cited

U.S. PATENT DOCUMENTS

| | | |
|---|---|---|
| 3,826,380 | 7/1974 | Lenander et al. . |
| 4,471,877 | 9/1984 | Whitly . |
| 4,969,745 | 11/1990 | Ibe . |
| 5,112,126 | 5/1992 | Graebner . |
| 5,127,533 | 7/1992 | Virkkunen . |
| 5,491,549 | 2/1996 | Wichner ........................ 356/141.2 |
| 5,550,733 | 8/1996 | Yun et al. ..................... 212/272 |

FOREIGN PATENT DOCUMENTS

| | | |
|---|---|---|
| 52-47253 | 4/1977 | Japan . |
| 61-274203 | 12/1986 | Japan . |
| 2-132097 | 5/1990 | Japan . |

OTHER PUBLICATIONS

"Automatic Control of an Overhead Crane", Ohnishi et al, Computer Systems Development Dept., Fukuyama Works, Nippon Kokan Kabushiki Kaisha, pp. XIV-37-XIV-42.

Automatica, vol. 23, No. 4, pp. 437-447, "Time Optimal Control of Overhead Cranes with Hoisting of the Load", Auernig et al, 1987.

Keyence, LB-70/LB-11, LB-72/LB-12, Laser Displacement Sensor Instruction Manual, pp. 2-17.

*Primary Examiner*—Stephen C. Buczinski
*Attorney, Agent, or Firm*—Nikaido, Marmelstein, Murray & Oram LLP

[57] ABSTRACT

A swing angle measuring apparatus generates feedback signals for closed loop regulation of a load swinging motion in operation of a crane. The swing angle measuring apparatus measures two-dimensional swing angles, and includes a rope fixed to a hoisting device, two laser displacement sensors, laser reflecting plates, and a rectangular box attached to a hoisting device. Two steel reflecting plates are installed on the periphery of the fixed rope. Two laser displacement sensors are installed in a rectangular box such that the heading of the sensors are configured to perpendicularly intersect the faces of the laser reflecting plates. The configuration of the displacement sensors and the reflecting plates can be reversed. The rectangular box is attached to the hoisting device, and the laser reflecting plates are placed at an offset distance away from the face of the laser displacement sensors, at which a sensor signal of 0 volts is obtained. The swing angle of the rope or cable is determined from the distance between the laser displacement sensors and the laser reflecting plates.

3 Claims, 6 Drawing Sheets

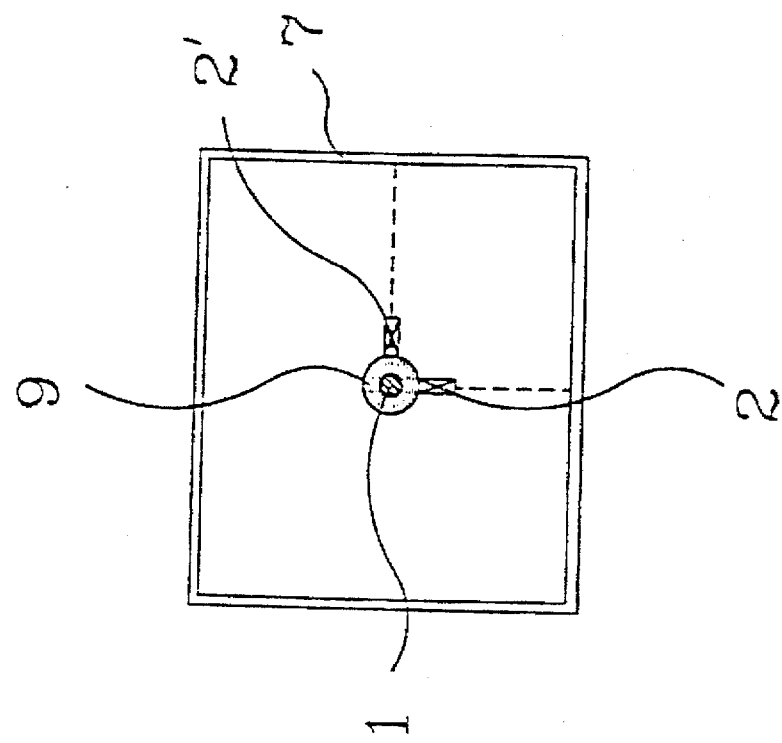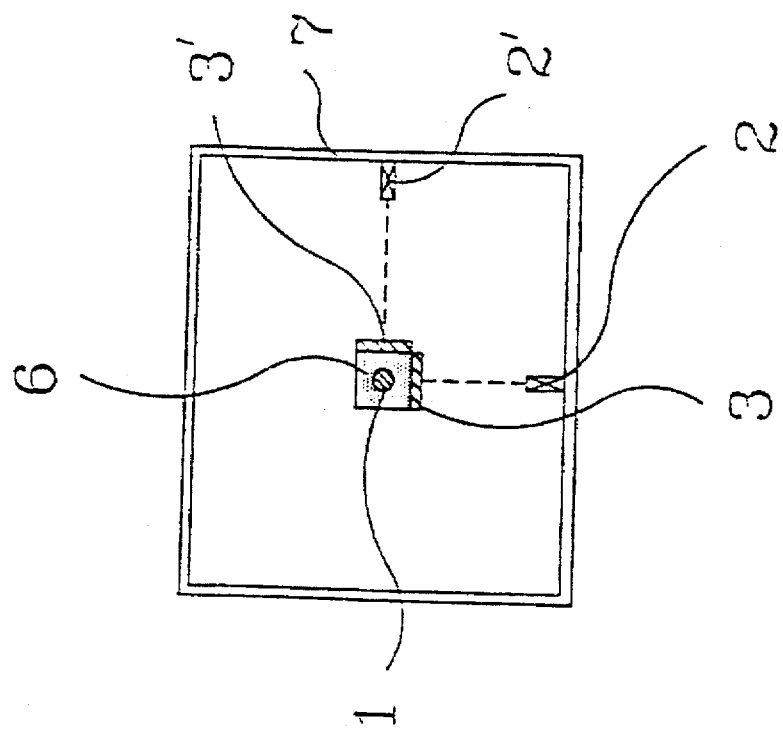

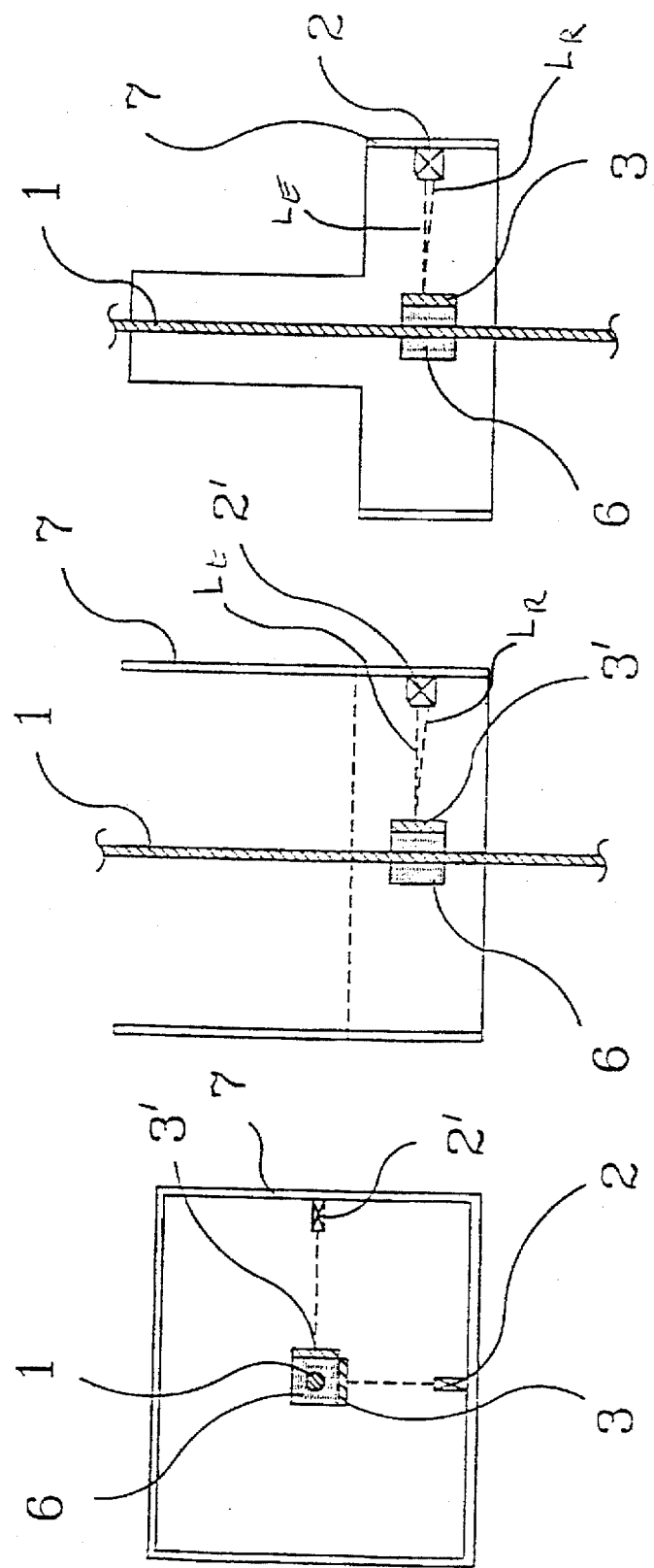

SWING ANGLE MEASURING APPARATUS FOR SWING FREE OPERATION OF CRANE

This application is a Continuation-in-Part of application Ser. No. 08/192,291, filed 4 Feb. 1994, now abandoned.

FIELD OF THE INVENTION

The present invention relates to a swing angle measuring apparatus which is used for the implementation of a swing free operation of a crane, and particularly it is used for measuring the swing angle of the load in two directions (travelling and traverse directions) during the transportation of the load suspended to a crane rope.

BACKGROUND OF THE INVENTION

In the industrial fields, cranes are widely used for transportation of heavy parts. Generally, a crane is operated by manipulating a push button switch, thus activating a driving motor. When the crane is accelerated or decelerated the carried load swings due to the inertial force.

Due to such swinging, the carried load may collide with another object or a person, thereby causing an accident. Furthermore, upon arriving at the destination, the load continues to swing for a significant amount of time, thereby aggravating the efficiency of uploading operation. In certain industrial processes, it is required that the load has to be unloaded at a precise position, but the swinging both at the starting point and at the destination, makes such tasks difficult.

In the case where the carried load is particularly heavy, the large inertial force caused by the swinging is transmitted to the supporting structure, so that the life expectancy of the supporting structure may be greatly shortened.

Therefore, much study has been made to develop an swing-free crane which eliminates such swinging.

There are two methods of eliminating the swinging of the carried load; one of them is a mechanical method, and the other is an algorithmic method. In the mechanical method, a separate actuator such as a pneumatic cylinder is provided to actively suppress the swinging of the rope. The algorithmic method utilizes the fact that the swing period $T=2\pi\sqrt{l/g}$ (where l=the length of the rope, and g=gravitational acceleration, 9.81 m/sec$^2$) of the load suspended to the crane rope is related to the length of the rope, and that the swing angle $\theta=\arctan(a/g)$ (where a=the acceleration of the crane) of the load is related to the acceleration and deceleration of the crane. By utilizing the above fact, a velocity path of a trolley of the crane can be predetermined in such a way to suppress the swing angle to zero, and the swing free operation is achieved by driving the trolley to follow this velocity path. This is called an open loop control method. In another method, the swing angle of the load is measured during the transportation and is fed back to a swing free controller which changes the trolley's acceleration or velocity according to the measured swing angle in such a way to suppress the swinging to zero. This is called a closed loop control method.

The mechanical method accompanies the problem of a structural complication. The open loop control method has the advantage that there is no need for measuring the swing angle of the load. However, since the performance of this method totally depends upon the pre-determined velocity path which is obtained by using a fixed rope length, the swinging may persist after the load stops in following cases. If the load collides with another object during the transportation, or if the length of the rope is to be varied during the transportation, then the pre-determined velocity path cannot accomodate the intended function. Therefore, the use of this method becomes unreliable in an automated factory, an unmanned storage facility, and an atomic facility, in which a precise swing control is required. Accordingly, the closed loop control method which can resolve such problems has to be used.

To implement this closed loop control method it is essential to measure the swing angle of the carried load and this measured value has to be fed back to a swing control algorithm. Therefore, in the present invention, a device which is capable of providing real time measurement of the swing angle of the carried lead is provided. It functions as an essential part for controlling the swinging of the carried lead, thereby improving the efficiency and stability of the crane, and contributing to the development of a swing free crane.

SUMMARY OF THE INVENTION

The objective of the present invention is to provide an apparatus which can measure the swinging of the carried load in the travelling and traverse directions simultaneously.

The key feature of the present invention is that two small laser displacement sensors are used so that the swinging angle can be precisely measured in two directions (the travelling and traverse directions) in real time.

BRIEF DESCRIPTION OF THE DRAWINGS

The above objectives and other advantages of the present invention may be better elucidated by describing in detail the preferred embodiment of the present invention with reference to the attached drawings in which:

FIG. 2 illustrates the installation of laser sensors and laser reflecting plates in two different embodiments;

FIG. 3 is a detailed illustration of the apparatus according to the present invention;

DESCRIPTION OF THE PREFERRED EMBODIMENT

The present invention provides an apparatus which is capable of providing two directional measurement of the swing angle of a carried load suspended to a rope of a crane.

In order to measure the swing angle in a two-dimensional manner, the following methods can be used.

First, there is a method in which a contact sensor (such as a rotary potentiometer, an encoder or the like) is used. This method utilizes the principle of a joy stick; the swinging of the rope rotates a shaft of the rotary potentiometer or the encoder and the amount of rotation is measured, thereby yielding the measurement of the swing angle.

Second, there is a method in which a non-contacting sensor (such as a laser displacement sensor, an ultra sonic sensor or the like) is used. In this method, the sensor is attached on the rope, and a reflecting plate is installed in front of it, thereby obtaining the swing angle, Third, there is a method in which CCD camera is used. In this method, a mark is put on the carried load and by identifying the position of this mark using CCD camera the swing angle of the load is computed.

Meanwhile, the performance of the swing-free control algorithm is greatly affected by the precision of the measurement of the swing angle. Accordingly, the present invention adopts two small laser displacement sensors which have a high precision in measuring distance. Each laser displacement sensor incorporates a laser beam emitting device and a position sensing device(PSD). The distance measurement principle of this sensor is briefly as follows; The laser beam emitted from the emitting device is reflected by the target and is received by the position sensing device which calculates the distance between the sensor face and the object. In implementing a two-dimensional swing angle measuring apparatus based on this method, the following conditions are required.

First, the sensor section should not move with the vertical movements of the rope.

Second, the sensor section should maintain its orientation irrespective of the twisting of the rope.

A laser reflecting plate is attached to the rope in such a manner that the above conditions are satisfied. Two laser sensors 2, 2' are installed at a certain distance perpendicularly away from face of the laser reflecting plate 3, 3', as shown in FIG. 2a.

Alternatively, two laser displacement sensors 2, 2' can be installed on the rope, and a rectangular box 7 can be used instead of laser reflecting plates as shown in FIG. 2b.

Figure 1:
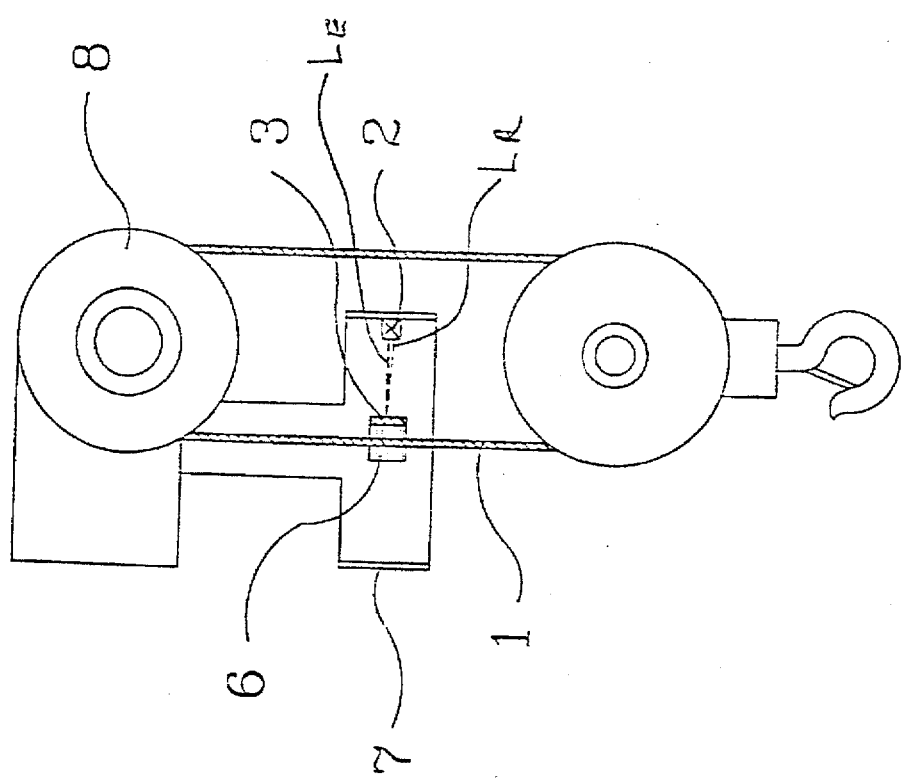
FIG. 1 is an exemplary view of the swinging angle measuring apparatus according to the present invention.

Referring to FIG. 1, FIG. 2a, and FIG. 3, the swing angle measuring apparatus according to the present invention mainly consists of: a rope 1 with its one end fixed at a hinged point on the hoisting device 8, two laser displacement sensors 2 and 2', laser reflecting plates 3 and 3' and a rectangular box 7.

Looking into its structure, two laser reflecting plates 3 and 3' (made of steel) of a certain size are mounted on two adjacent sides of a small cube 6 which is inserted to the fixed rope 1 at a certain distance below the hinged point of the fixed rope 1. Two laser displacement sensors 2 and 2' are bolted in a rectangular box 7(made of steel), in such a way that the sensor's heading directions perpendicularly intersect the faces of said laser reflecting plates 3 and 3', respectively. The rectangular box is, in turn, attached to the hoisting device 8.

Initially each laser reflecting plate is placed at an offset distance away from the face of laser displacement sensor at which the sensor signal of 0 volt is obtained.

Figure 4:
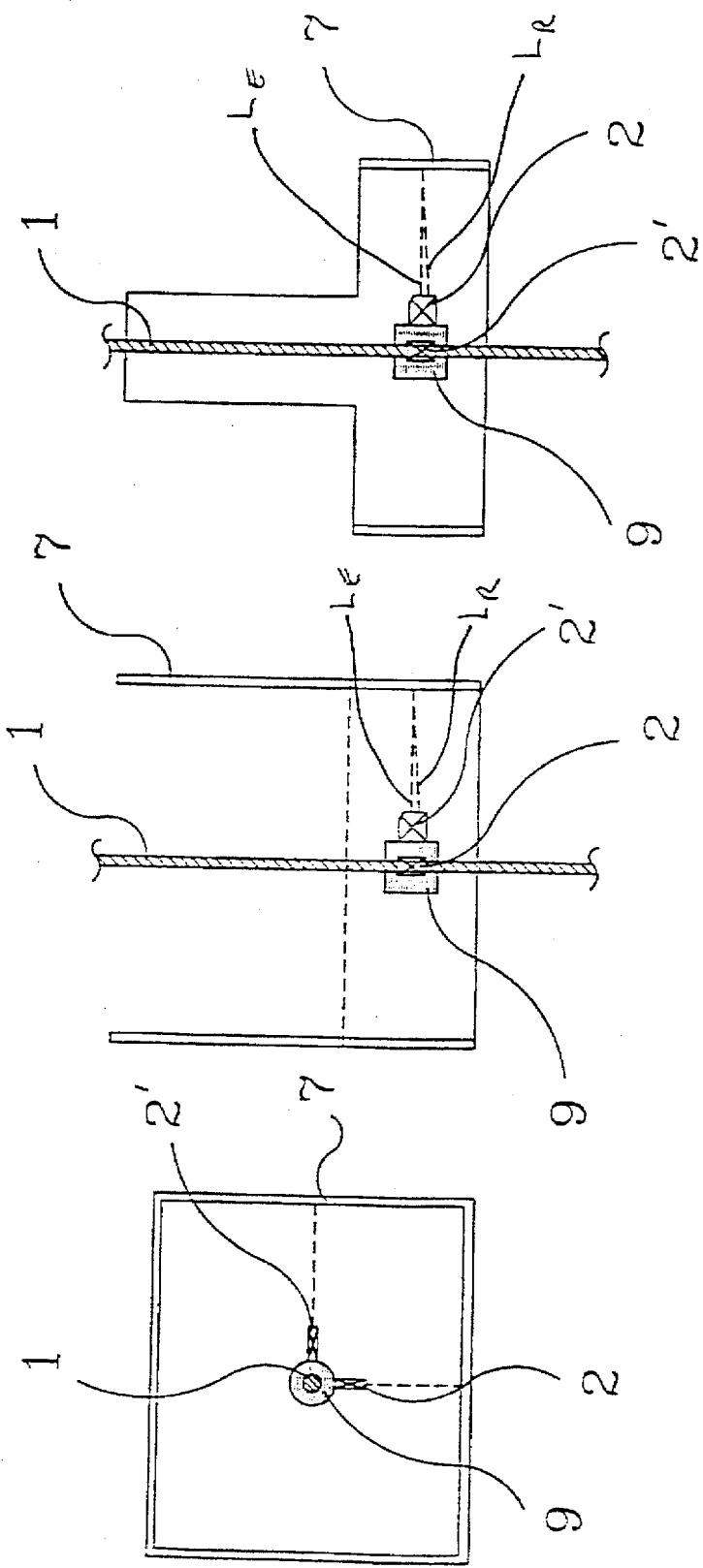
FIG. 4 illustrates another embodiment of the apparatus according to the present invention.

The alternative design of the swing angle measuring apparatus is configured to have been exchanged the locations of laser reflecting plates and laser displacement sensors. Referring to FIG. 2b and FIG. 4, two laser displacement sensors are bolted on a ring 9 with their heading directions perpendicular to each other. The ring 9 is, in turn, inserted to the rope 1. In this configuration, a rectangular box 7 is used instead of two laser reflecting plates.

In this case, it is possible that the laser displacement sensors are rotated with the rope as the rope twists. This rotation deteriorates the accuracy of the swing angle measurement since the distance between the faces of two laser displacement sensors and the rectangular box is changed. Therefore, as shown in FIG. 5, two ball bearings 5, 12 and a tension coil spring 4 are introduced to prevent the undesirable rotation of the laser displacement sensor.

Figure 5:
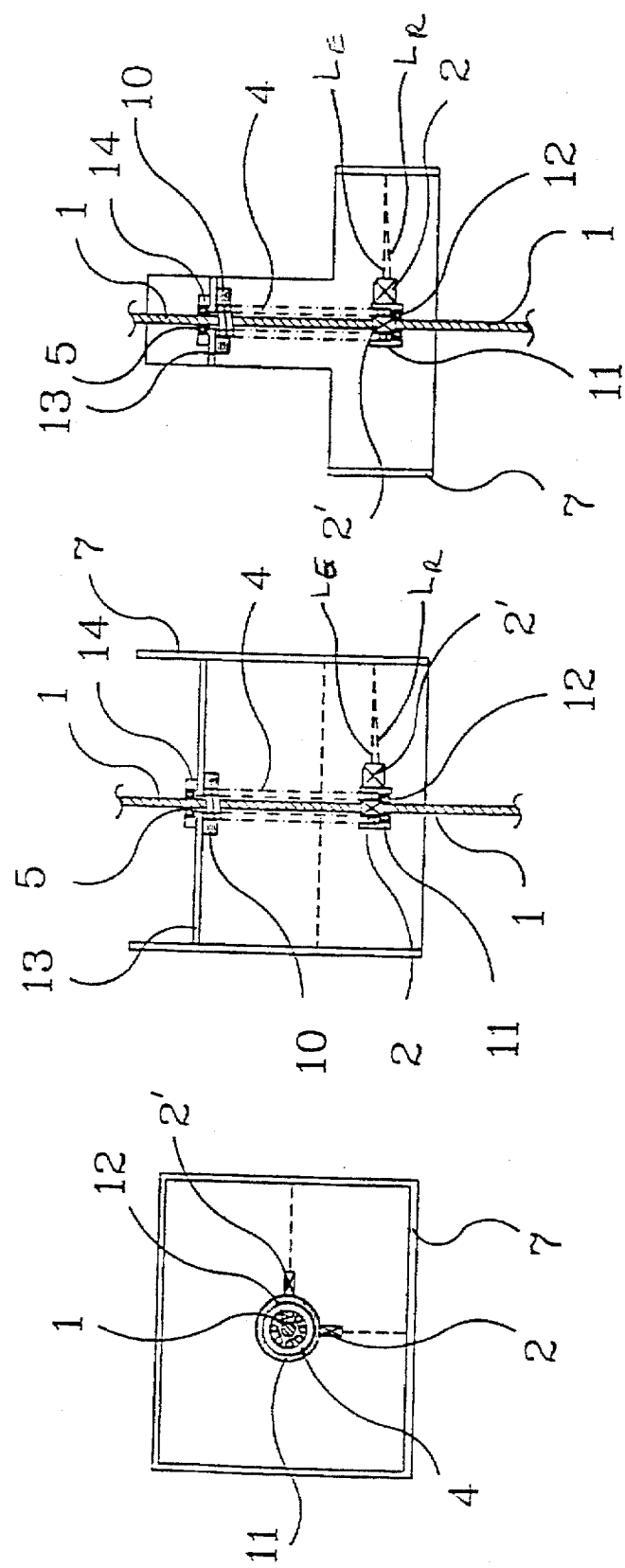
FIG. 5 illustrates the case where a spring and radial ball bearings are installed.

Referring to FIG. 5, the tension coil spring 4 with inner diameter larger than that of the rope is inserted over the rope 1 with its one end screwed into a threaded nut 10 which is, in turn, bolted to a bearing support plate 13. The other end of the tension coil spring is screwed into the ring 11 which is internally threaded. Two laser displacement sensors 2,2' are bolted on the outer face of the ring 11 in such a way that the heading directions of the sensor faces perpendicularly intersect the each face of said rectangular box 7, respectively.

The tension coil spring has a high stiffness in the longitudinal direction and a low stiffness in the transverse direction. Therefore, when the rope swings, the tension coil spring is easily deflected in the swinging direction while preventing the extension of the spring in the longitudinal direction. Therefore, the distance between a hinged point of the spring and the laser displacement sensors is kept invariant, while the swing motion of the rope is directly transmitted to two laser displacement sensors.

By inserting the tension coil spring between the rope and two laser displacement sensors, the rope and two laser displacement sensors become without contact. This prevents the rotation of the laser displacement sensors due to the rope twisting. However, in this case, the signals from two laser displacement sensors remain unchanged until the rope touches the coil spring, and consequently precise measurement of the swing angle becomes impossible.

Therefore, two radial ball bearings 5, 12 are installed near both ends of the tension coil spring. Referring to FIG. 5, the upper bearing 5 is installed inside a bearing bracket 14 which is attached to the bearing support plate 13 and the rope is inserted through the inner ring of the bearing. The lower bearing 12 is attached to the lower end of the ring 11 and the rope is also inserted through the inner ring of the bearing. These two radial ball bearings have identical size and the inner diameter is slightly larger than that of rope and slightly smaller than the inner diameter of tension coil spring. As a result, the swinging motion of rope is directly transmitted to the laser displacement sensors while the twisting motion of rope is not transmitted to the laser displacement sensors.

Meanwhile, it is still possible that the tension coil spring is extended by applying a certain force. Therefore, in the present invention, the weights of the laser displacement sensors 2, 2', the ring 11 and the radial ball bearing 12 shown in FIG. 5 are taken into account, and thus a tension coil spring having a certain tension constant is used.

The attachment positions of the laser displacement sensors and the laser reflecting plates in horizontal and vertical directions are closely related with the distance measurement principle of the laser displacement sensor. This sensor is commercially available and the example of such sensors are model LB-70/LB-11, LB-72/LB-12 produced by Keyence Co., LTD., model LAS-5010 produced by Nippon Automation Co., LTD., and model AMS-90 series produced by Koden Industry Co., LTD. An embodiment of the invention was made with the LB-70/LB-11 sensors for a swing angle measurement apparatus.

Figure 6:
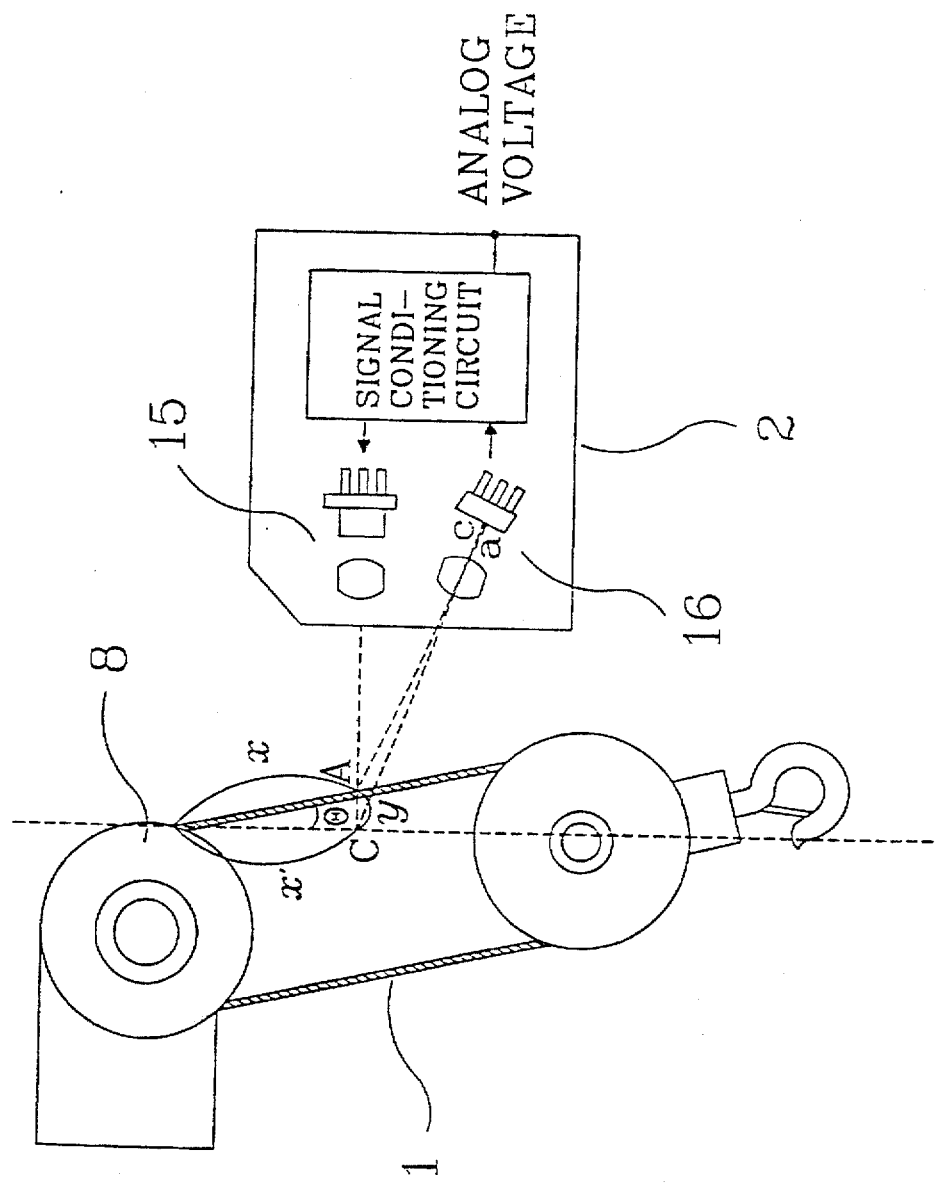
FIG. 6 illustrates the measurement principle of a laser displacement sensor and the swing angle measuring apparatus.

Referring to FIG. 6 the brief principle of this sensor is as follows; The laser displacement sensor integrates a laser beam emitting device 15, a position sensing device (PSD) 16, and an appropriate signal conditioning circuit. The laser beam emitting device 15 emits the laser beam $L_E$ to the target located at point A which is used by the laser reflecting plate in our case. The reflected laser beam $L_R$ from the target returns to the PSD 16 and makes a light spot on the surface of the PSD. The PSD generates a current proportional to the distance between a reference point(point c) and a sensed light spot(point a) on the surface of the PSD. This current is amplified and processed by the signal conditioning circuit, thereby producing the analog voltage proportional to the distance between the target position(point A) and a stand-off position(point C). if the target is located at the stand-off position(point C), the sensed light spot is made at the reference point(point c) on the surface of PSD and the sensor outputs the zero volt.

Based on the measurement principle of the laser displacement sensor, the initial offset distance between the sensor face and the laser reflecting plate is set to be equal to the distance between the stand-off position and the sensor face so that the sensor signal of 0 volt is obtained with the swing angle of 0 degree.

The attachment position of the laser displacement sensors in the length direction of the rope (vertical length) is determined by the maximum swing angle of the carrying load and the maximum measurable distance of the laser displacement sensor. Referring to FIG. 6, if the maximum measurable distance of the sensor is $\pm y_{max}$ and the maximum swing angle is $\pm \theta_{max}$, then the vertical length(x) is given as $y_{max}/\sin \theta_{max}$. For example, when it is assumed that the maximum swing angle of the load($\theta_{max}$) is 10 degrees, and the maximum measurable distance of the sensor($y_{max}$) is 40 mm, then, based on a trigonometric formula x=40 mm/sin 10, the attachment position of the laser displacement sensor is determined to be 23 cm below the hinge point of the rope.

Referring to FIG. 6 the measurement of swing angle is achieved according to the following principle. When the rope 1 swings, the distance between the point A at which the laser reflecting plate is located and the face of the laser displacement sensor is proportionally varied. Then, the laser displacement sensor measures the distance between the point A and the point C (stand-off position) and outputs the analog voltage proportional to this distance.

Also, the other laser displacement sensor measures the distance between the stand-off position and the other laser reflecting plate in the perpendicular direction so that the analog voltages both in travelling and traverse direction are obtained simultaneously.

These voltages can be inputted to an analog or digital computer and are converted to equivalent swing angles($\theta$) based on the same trigonometric formula used when determining the attachment position of the laser displacement sensor(i.e. $\theta=\arcsin(y/x)$). Thus, the swing angles in the travelling and traverse direction are obtained simultaneously.

In accordance with the evolutionary progress in the electronics and control techniques, the automatic processes are being rapidly realized in various industrial fields. The crane which is widely used in various industrial fields is operated by manipulating push buttons, and this kind of operation requires a human expert who can safely transport the load while suppressing the swingings of the carried load. Therefore, the efficiency of the crane operation totally depends on the skill of the operator.

To this end, the apparatus of the present invention can effectively be used to measure the swing angles of the load in real time and provide control input into the swing free control algorithm, so that the automation of the crane operation can be realized without resorting to the skill of the operator.

We claim:

1. A swing angle measuring apparatus for generating feedback signals in closed loop regulation of load swinging motion in a crane operation, said apparatus comprising:

a rope with one end thereof fixed at a hinged point to a hoisting device;

two laser displacement sensors; and two laser reflecting plates configured to reflect a laser beam emitted from said laser displacement sensors, wherein said two laser reflecting plates are installed along a periphery of said rope, with reflecting surfaces thereof disposed perpendicular to each other, wherein said two laser displacement sensors are installed in a rectangular box which is attached to the hoisting device, in such a way that a laser emitting face of a first sensor perpendicularly intersects the reflecting surface of a first one of said two laser reflecting plates and wherein a laser emitting face of a second sensor perpendicularly intersects the reflecting surface of a second one of said two laser reflecting plates, wherein said two laser reflecting plates are placed at a standoff position located a predetermined offset distance away from the two laser displacement sensors at which a sensor signal of 0 volt is obtained, wherein said laser reflecting plates are placed at a certain distance (x) below the hinged point of the rope and x is determined based on a trigonometric formula $x=y_{max}/\sin \theta_{max}$ where $y_{max}$ is a maximum measurable distance of said laser displacement sensor and $\theta_{max}$ is a maximum swing angle of the load, and wherein swing angles ($\theta$) of the rope in both travelling and traverse directions are determined from the distances (y) between the stand-off position at which said laser displacement sensors output 0 volts and said laser reflecting plates based on a trigonometric formula $\theta=\arcsin(y/x)$.

2. A swing angle measuring apparatus for generating feedback signals in closed loop regulation of load swinging motion in a crane operation, said apparatus comprising:

a rope with one end thereof fixed at a hinged point to a hoisting device;

two laser displacement sensors; and two laser reflecting plates configured to reflect a laser beam emitted from said laser displacement sensors, wherein said two laser displacement sensors are installed on the periphery of said rope with laser emitting faces thereof disposed perpendicular to each other, wherein said two laser reflecting plates are installed in a rectangular box which is attached to the hoisting device, in such a way that the laser emitting face of a first sensor perpendicularly intersects a reflecting surface of a first one of said two laser reflecting plates and wherein the laser emitting face of a second sensor perpendicularly intersects a reflecting surface of a second one of said two laser reflecting plates, wherein said two laser displacement sensors are placed at a standoff position located a predetermined offset distance away from the two laser reflecting plates at which a sensor signal of 0 volt is obtained, wherein said laser displacement sensors are placed at certain distance (x) below the hinged point of the rope and x is determined based on a trigonometric formula $x=y_{max}/\sin \theta_{max}$ where $y_{max}$ is a maximum measurable distance of said laser displacement sensor and $\theta_{max}$ is a maximum swing angle of the load, and wherein swing angles ($\theta$) of the rope in both travelling and traverse directions are determined from the distances (y) between the standoff position at which said laser displacement sensors output 0 volts and said laser reflecting plates based on a trigonometric formula $\theta=\arcsin(y/x)$.

3. A swing angle measuring apparatus as recited in claim 2, further comprising a tension coil spring coaxially disposed around a section of said rope, said tension coil spring attached to said rope at an upper portion thereof and a lower portion thereof by upper and lower radial ball bearings, said tension coil spring and said radial ball bearings configured to prevent rotation of the two laser displacement sensors as a result of rope twisting motion, thereby enhancing accuracy of the swing angle measurement by enabling accurate distance measurements independent of the rope twisting motion.

* * * * *